United States Patent
Qian et al.

(10) Patent No.: US 12,067,144 B2
(45) Date of Patent: Aug. 20, 2024

(54) SYSTEM AND METHOD FOR PRIVACY-PRESERVING USER DATA COLLECTION

(71) Applicant: Samsung Electronics Co., Ltd., Suwon-si (KR)

(72) Inventors: Jianwei Qian, Mountain View, CA (US); Xun Chen, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 17/375,976

(22) Filed: Jul. 14, 2021

(65) Prior Publication Data

US 2022/0269816 A1    Aug. 25, 2022

Related U.S. Application Data

(60) Provisional application No. 63/151,174, filed on Feb. 19, 2021.

(51) Int. Cl.
*H04L 29/06*      (2006.01)
*G06F 21/62*      (2013.01)
*G06N 20/00*      (2019.01)

(52) U.S. Cl.
CPC ......... *G06F 21/6245* (2013.01); *G06N 20/00* (2019.01)

(58) Field of Classification Search
CPC .................................................. G06F 21/6245
See application file for complete search history.

(56) References Cited

U.S. PATENT DOCUMENTS

| | | | |
|---|---|---|---|
| 9,705,908 B1 | 7/2017 | Thakurta et al. | |
| 10,873,456 B1* | 12/2020 | Dods | H04L 9/0822 |
| 2011/0083013 A1* | 4/2011 | Nice | G06F 21/6263 |
| | | | 713/168 |

(Continued)

FOREIGN PATENT DOCUMENTS

| | | |
|---|---|---|
| CN | 110674528 A | 1/2020 |
| CN | 111723404 A | 9/2020 |

(Continued)

OTHER PUBLICATIONS

International Search Report and Written Opinion of the International Searching Authority regarding International Patent Application No. PCT/KR2022/001252 dated May 9, 2022, 11 pages.

(Continued)

*Primary Examiner* — Jason K Gee

(57) ABSTRACT

A method includes obtaining, by an application executing on a processor of an electronic device, user data of a user, generating a representation of the user data, applying local differential privacy to the representation of the user data, to generate a transform of the representation of the user data, sending the transform of the representation of the user data, to a service provider via a network and receiving, from the service provider, via the network, service data based on the transform of the user data. The service data includes a user-specific output based on the transform of the user data. The application executes outside of a trusted execution environment (TEE) of the electronic device. The transform of the representation of the user data is generated in the TEE of the electronic device.

20 Claims, 8 Drawing Sheets

(56) References Cited

U.S. PATENT DOCUMENTS

| | | | |
|---|---|---|---|
| 2015/0372808 A1* | 12/2015 | Bilogrevic | G06N 7/01 |
| | | | 380/279 |
| 2018/0198602 A1* | 7/2018 | Duffy | G06F 40/117 |
| 2020/0036519 A1* | 1/2020 | Bitauld | H04L 9/0897 |
| 2020/0311300 A1* | 10/2020 | Callcut | G06N 20/00 |
| 2020/0327250 A1 | 10/2020 | Wang et al. | |
| 2020/0382281 A1* | 12/2020 | Fletcher | G06N 7/01 |
| 2020/0382553 A1 | 12/2020 | Savalle et al. | |
| 2020/0410134 A1 | 12/2020 | Bhowmick et al. | |

FOREIGN PATENT DOCUMENTS

| | | | |
|---|---|---|---|
| EP | 3522056 A1 | 8/2019 | |
| EP | 3525388 A2 | 8/2019 | |
| JP | 2018097467 A | 6/2018 | |

OTHER PUBLICATIONS

Arachchige, Pathum Chamikara Mahawaga, et al., "Local Differential Privacy for Deep Learning", IEEE Internet of Things Journal, Nov. 9, 2019, vol. XX, No. XX, 16 pages.

* cited by examiner

| | | | | | | |
|---|---|---|---|---|---|---|
| My | name | is | Jack | My name | name is | is Jack |
| 30 | 10 | 40 | 20 | 9 | 9 | 20 |

601 — 603 h(dummy) 605 — 607 609

| h(dummy) | h(Jack) | h(name is) | h(My) | h(dummy) | h(is Jack) | h(My name) | h(name) | h(is) |
|---|---|---|---|---|---|---|---|---|
| 35 | 20 | 9 | 30 | 26 | 20 | 9 | 10 | 40 |

611 — 613 615

| h(dummy) | h(Jack) | h(name is) | h(My) | h(dummy) | h(is Jack) | h(My name) | h(name) | h(is) |
|---|---|---|---|---|---|---|---|---|
| 29 | 16 | 19 | 36 | 28 | 18 | 10 | 13 | 34 |

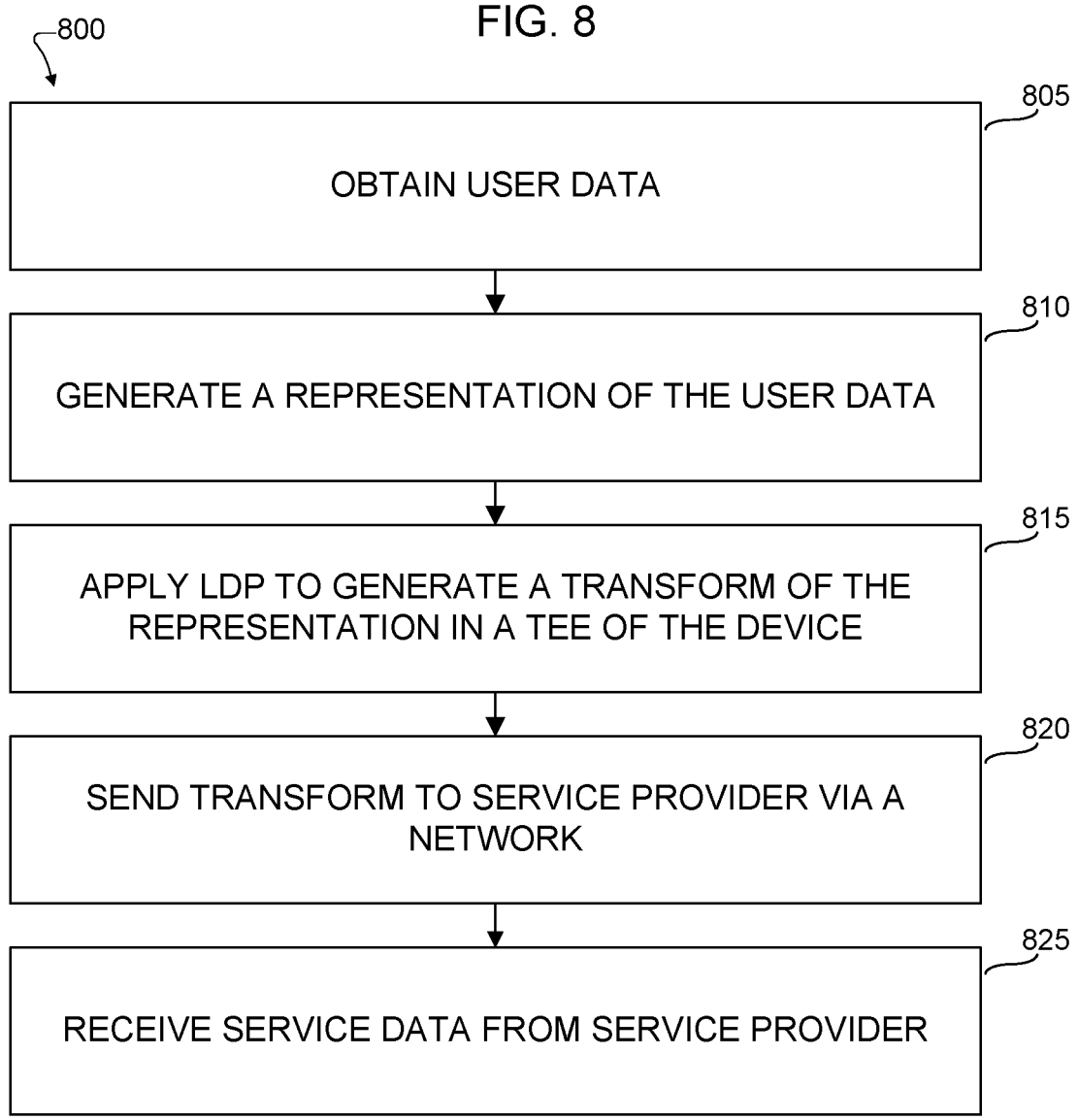

SYSTEM AND METHOD FOR PRIVACY-PRESERVING USER DATA COLLECTION

CROSS-REFERENCE TO RELATED APPLICATION AND CLAIM OF PRIORITY

This application claims priority under 35 U.S.C. § 119(e) to U.S. Provisional Patent Application No. 63/151,174 filed on Feb. 19, 2021. The above-identified provisional patent application is hereby incorporated by reference in their entireties.

TECHNICAL FIELD

This disclosure relates generally to digital security and the collection of user data from electronic devices for providing services through the electronic devices. More specifically, this disclosure relates to a system and method for privacy-preserving user data collection.

BACKGROUND

Advances in, without limitation, battery technology, processor efficiency, miniaturization of sensors and expansion of wireless communication functionalities, have given rise to a new generation of computing platforms, such as smartphones, smart watches and tablets providing a far more personalized computing experience than the previous generation of computing platforms inaptly referred to as "personal computers." Smartphones and other devices of this new generation not only serve as a primary platform for most, if not all, of their users' computing tasks, such as web browsing, engaging with social media and productivity applications, and messaging via email or text, but also, by dint of their small size and portability, accompany their users throughout their day. Given their dual roles as their user's primary computing device and digital companions, smartphones and other such devices can, and do, collect a wealth of data about their users' habits, preferences and needs, for example, how often they walk, when they go to bed, and words which they frequently type. This personal data can be uploaded to service providers to build datasets for training applications providing services on the user's device. For example, a user's address book and typing habits can be used to train a model to provide "quick keys" or "autocomplete" functionalities based on partial inputs. As an example, a user's data could be used to suggest "David Smith" as an autocompletion of the keystrokes "d-a-v." For many users, the use of personal user data for training application services provided through their devices raises security and privacy concerns regarding the collection of information that, if mishandled, could be used maliciously, such as to perpetrate identity theft. Thus, implementing device-based user data collection in a way that reconciles users' desire for personalization of their devices against concerns about sharing identifying information that is susceptible to misuse, remains a source of technical challenges and opportunities for improvement in the art.

SUMMARY

This disclosure provides a system and method for privacy-preserving user data collection.

In a first embodiment, a method includes obtaining, by an application executing on a processor of an electronic device, user data of a user, generating a representation of the user data, applying local differential privacy to the representation of the user data, to generate a transform of the representation of the user data, sending the transform of the representation of the user data, to a service provider via a network and receiving, from the service provider, via the network, service data based on the transform of the user data. The service data includes a user-specific output based on the transform of the user data. The application executes outside of a trusted execution environment (TEE) of the electronic device. The transform of the representation of the user data is generated in the TEE of the electronic device.

In a second embodiment, an apparatus includes a processor, a network interface, a sensor configured to receive user data and a memory. The memory contains instructions, that when executed by the processor, cause the apparatus to obtain, by an application executing on the processor of the apparatus, from the sensor, user data of a user, generate a representation of the user data, apply local differential privacy to the representation of the user data, to generate a transform of the representation of the user data, send the transform of the representation of the user data, to a service provider via the network interface, and receive, from the service provider, via the network interface, service data based on the transform of the user data. The service data includes a user-specific output based on the transform of the user data. The application executes outside of a trusted execution environment (TEE) of the apparatus. The transform of the representation of the user data is generated in the TEE of the apparatus.

In a third embodiment, a non-transitory, computer-readable medium contains instructions, that when executed by a processor, cause an apparatus to obtain, by an application executing on the processor of the apparatus, from a sensor, user data of a user, generate a representation of the user data, apply local differential privacy to the representation of the user data, to generate a transform of the representation of the user data, send the transform of the representation of the user data, to a service provider via a network interface, and receive, from the service provider, via the network interface, service data based on the transform of the user data. The service data includes a user-specific output based on the transform of the user data. The application executes outside of a trusted execution environment (TEE) of the apparatus. The transform of the representation of the user data is generated in the TEE of the apparatus.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 6 illustrates a representation of user data and a transform thereof according to embodiments of this disclosure;

FIG. 8 illustrates a process for providing privacy preserving collection of user data according to embodiments of this disclosure.

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged processing platform.

Figure 1:
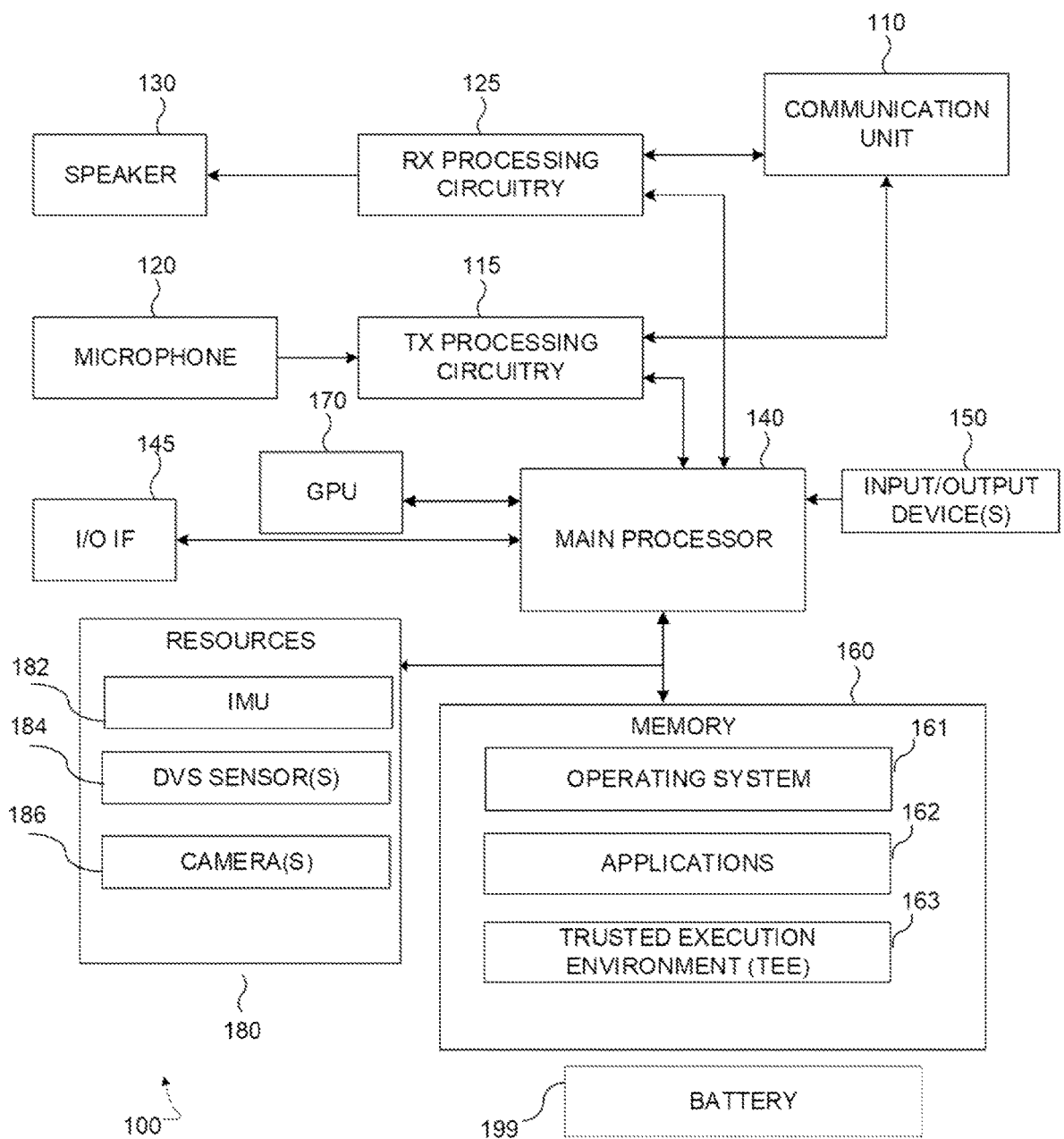
FIG. 1 illustrates an apparatus according to embodiments of this disclosure.

FIG. 1 illustrates a non-limiting example of a device 100 operating as a user device at which user data is collected, passed to an outside device, and through which a service is provided, according to some embodiments of this disclosure. According to various embodiments of this disclosure, device 100 could be implemented as one or more of a smartphone, a tablet, or a head-mounted device (HMD) for providing an augmented reality (AR) experience. In some embodiments, device 100 is portable and accompanies a user throughout the day and is capable of obtaining user data across multiple sources, such as a camera, a motion sensor, a web browser, and a global positioning system (GPS) sensor.

The embodiment of device 100 illustrated in FIG. 1 is for illustration only, and other configurations are possible. The embodiment of the device 100 shown in FIG. 1 is for illustration only. It is further noted that suitable devices come in a wide variety of configurations, and FIG. 1 does not limit the scope of this disclosure to any particular implementation of a device. Skilled artisans will appreciate that there is a wide and ever-expanding universe of devices which provide computing platforms from which user data can be obtained. As used in this disclosure, the expression, "user data" encompasses data and metadata that is reflective of a user's use of, and interaction with the device. User data includes, without limitation, data generated through direct user inputs (for example, keystrokes and words typed into an application), data generated by applications as a result of the user's use of the application (for example, image files generated from a camera application, or user profiles from other applications), and metadata regarding a user (for example, the number of hours of screen time a user logs per day).

As shown in the non-limiting example of FIG. 1, the device 100 includes a communication unit 110 that may include, for example, a radio frequency (RF) transceiver, a BLUETOOTH transceiver, or a WI-FI transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, extended reality (XR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. According to some embodiments, applications 162 include applications that can consume or otherwise utilize identifications of planar surfaces in a field of view of visual sensors of device 100.

The communication unit 110 may receive an incoming RF signal, for example, a near field communication signal such as a BLUETOOTH or WI-FI signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller. According to certain embodiments, main processor 140 is a low-power processor, such as a processor which includes control logic for minimizing consumption of battery 199 or minimizing heat buildup in device 100.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. The main processor 140 is also coupled to the I/O interface 145, which provides the device 100 with the ability to connect to other devices such as laptop computers and handheld computers. The I/O interface 145 is the communication path between these accessories and the main processor 140.

According to certain embodiments, memory 160 may comprise memory spaces reserved for a trusted execution environment 163 (for example, the ARM TrustZone), wherein certain processes are, through a combination of hardware and software, isolated from applications running generally on device 100, and are not accessible to devices or processes operating outside of device 100. According to some embodiments, trusted execution environment 163 utilizes physically separate memory spaces from those used for other applications 162. Depending on embodiments, trusted execution environment 163 may also be implemented by using a separate processor of main processor 140 to further quarantine data and processes executing in trusted execution environment 162 from less secure applications and processes executing on device 100.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with device 100. In some embodiments, input/output device(s) 150 can include a touch panel, an augmented or virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170.

According to certain embodiments, device 100 includes a variety of additional resources 180 which can, if permitted, be accessed by applications 162. According to certain embodiments, additional resources 180 include an accelerometer or inertial measurement unit (IMU) 182, which can detect movements of the electronic device along one or more degrees of freedom. Additional resources 180 include, in some embodiments, one or more dynamic vision sensors 184, and one or more cameras 186 (for example, complementary metal oxide semiconductor (CMOS) sensor type cameras) of device 100. According to various embodiments, DVS sensor(s) 184 comprises a pair of dynamic vision sensors spaced at a stereoscopically appropriate distance for estimating depth at over a field of depth of interest. According to some embodiments DVS sensor(s) 184 comprise a plurality of DVS sensors with overlapping, or partially overlapping fields of view.

According to various embodiments, the above-described components of device 100 are powered by battery 199 (for example, a rechargeable lithium-ion battery), whose size, charge capacity and load capacity are, in some embodiments, constrained by the form factor and user demands of the device. As a non-limiting example, in embodiments where device 100 is a smartphone, battery 199 is configured to fit within the housing of the smartphone and is configured not to support current loads (for example, by running a graphics processing unit at full power for sustained periods) causing heat buildup.

Although FIG. 1 illustrates one example of a device 100, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operating environment in which various features disclosed in this patent document can be used, these features could be used in any other suitable system.

Figure 2:
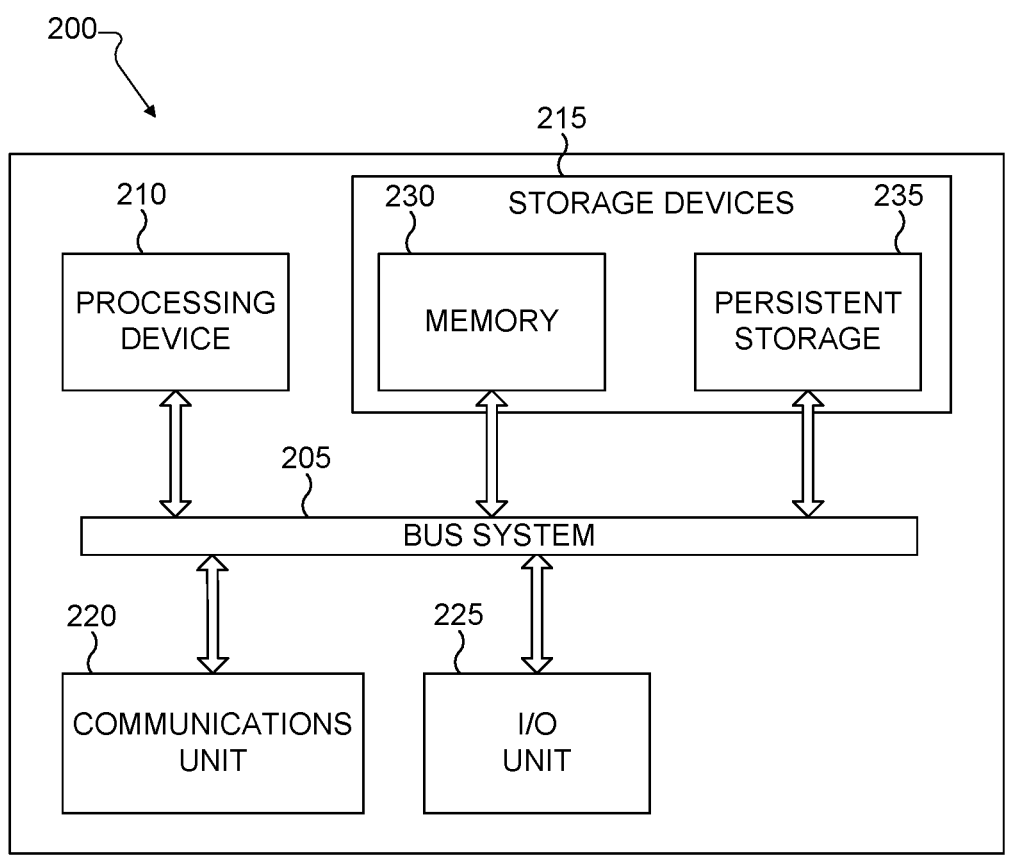
FIG. 2 illustrates a server suitable for operating as a service provider platform according to embodiments of this disclosure.

FIG. 2 illustrates an example of a server 200 that can be configured to process user data to generate service data according to certain embodiments of this disclosure. As used in this disclosure, the expression "service data" encompasses data that is based on, or generated in response to accumulated user data. Examples of service data include, without limitation, autocomplete suggestions generated based upon lexical habits detected in a user's user data. Further, non-limiting examples of "service data" include commands to applications generated in response to recognized voice commands, wherein the voice recognition functionality of the device is trained and optimized (for example, to handle regional accents and expressions) based on user data. The embodiment of the server 200 shown in FIG. 2 is for illustration only and other embodiments could be used without departing from the scope of the present disclosure. According to certain embodiments, server 200 implements one or more machine learning (ML) or artificial intelligence (AI) models which are trained on user data and can output service data.

In the example shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discrete circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Figure 3:
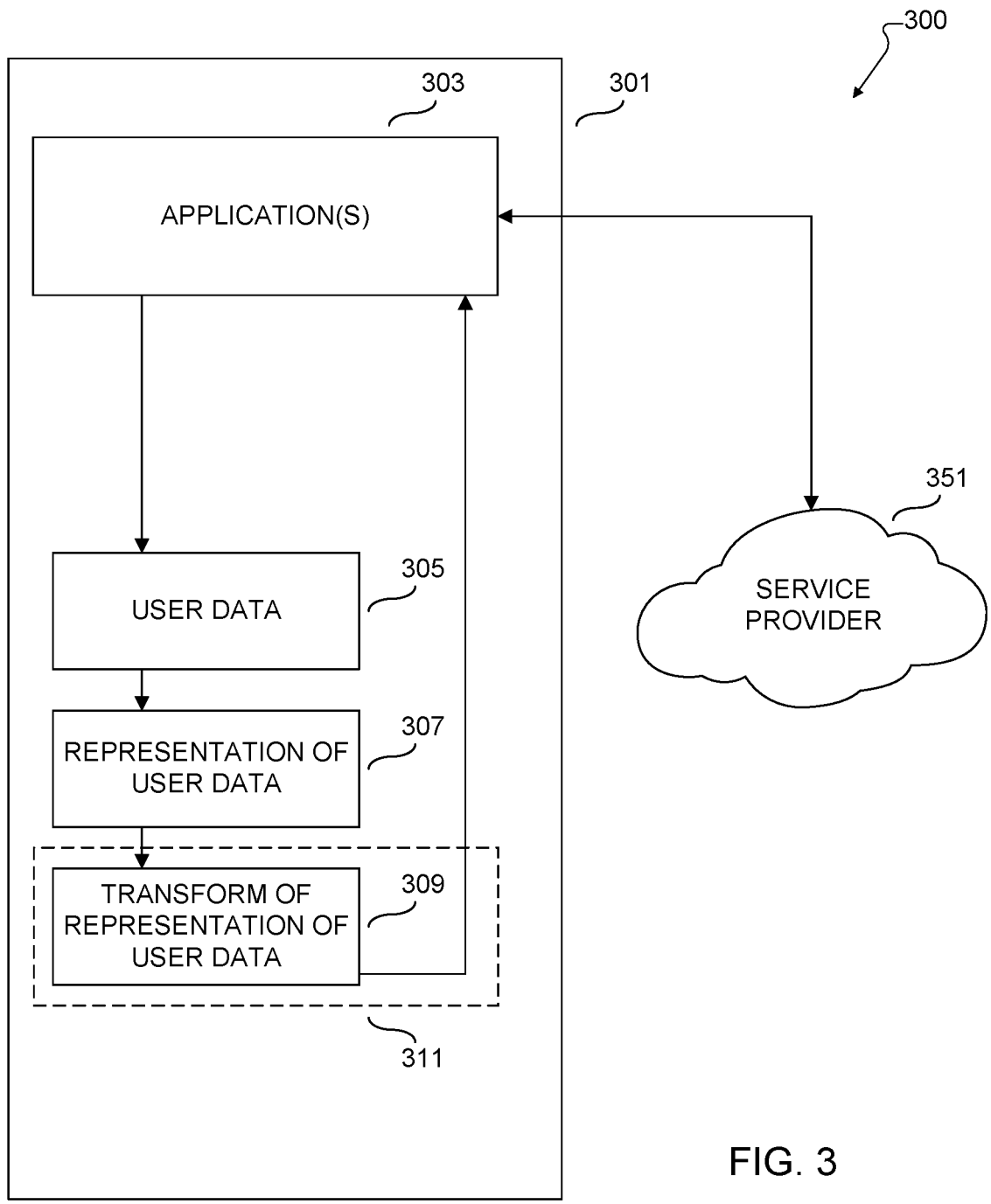
FIG. 3 illustrates an architecture for providing privacy preserving collection of user data according to embodiments of this disclosure.

FIG. 3 illustrates an example of a high-level architecture 300 for implementing privacy-preserving user data collection and generation of service data according to various embodiments of this disclosure.

Referring to the non-limiting example of FIG. 3, in this example, architecture 300 comprises two communicatively connected computing platforms, a first device 301 (for example, device 100 in FIG. 1) and a service provider platform 351. According to some embodiments, service provider platform 351 is embodied on one or more dedicated servers (for example, server 200 in FIG. 2) or similar machines. In other embodiments, service provider platform 351 is implemented as part of a computing cloud, as a process executing across a set of machines.

According to various embodiments, first device 301 comprises a memory storing one or more applications 303 (for example, applications 162 in FIG. 1), which collect user data, and provide a service that personalizes the execution of the one or more applications 303 based on modelling or further backend processing performed at service provider platform 351. Depending on embodiments, each application of applications 303 may collect user data associated with a service provided through the application, or for a service provided through another application. As a non-limiting example of the latter, a navigation application may collect user data from a scheduling or calendar application to suggest navigation directions for a specific appointment.

Referring to the non-limiting example of FIG. 3, application(s) 303 collect a set of user data 305 that includes data that identifies the user or may be otherwise susceptible to misuse. Recognizing the tension between service providers' reliance on user data to train models and generate personalized service data, and users' legitimate concerns about the dissemination and potential misuse of data that identifies them, or is otherwise specific to them, certain embodiments according to the present disclosure address this tension by first obtaining a representation of the user data, and then leveraging the enhanced security of a trusted execution environment to transform the representation of the user data. In this way, the data that is provided over a network to service provider 351 is sufficiently altered from the user data as to no longer present the privacy concerns of the underlying data, but, at the same time, sufficiently reflective of properties of the user and her interactions with one or more applications 303 on device 301 as to be effective as source data for training models and generating service data by service provider 351.

According to certain embodiments, at block 307, device 301 generates a representation of the set of user data 305. Depending on embodiments, generating a representation of the user data may comprise, without limitation, performing a hash of user data 305, reducing the dimensionality of user data 305 (for example, by performing principal component analysis (PCA) or performing t-distributed stochastic neighborhood embedding (t-SNE)), obtaining a vector representation of user data 305, re-expressing user data 305 as a set of key-value pairs, or encoding the user data. Depending on embodiments, the operations shown at block 307 may be performed within a trusted execution environment 311 provided on electronic device 301.

As shown in the illustrative example of FIG. 3, at block 309, a transform of the representation of the user data obtained at block 307 is generated in TEE 311. In this way, certain embodiments as disclosed and claimed by the present disclosure leverage the TEE's inaccessibility to other external devices and other processes operating on device 301 by further altering what is ultimately sent to service provider 351 in a processing environment that cannot be "seen" by malicious processes (for example, spyware) on device 301. In this way, the specifics of how the representation of the user data is further transformed cannot be detected, thereby making it especially difficult to recover any user specific data from the transform.

According to some embodiments, the transform performed at block 309 comprises a perturbation, or strategically selected change to the data as provided through the representation of user data. Examples of transforms that may be performed at block 307 include, without limitation, adding noise to the representation of the user data, suppressing items of data within representation of data, substituting dummy data for data provided in the representation, or generalizing otherwise identifyingly specific items of data within the representation of the user data. As used herein, the expression "strategically selected change to the data" encompasses choosing a method for perturbing the data in the representation of the user data in a way that makes the data different, but still sufficiently intelligible for generating service data.

Referring to the non-limiting example of FIG. 3, as shown in the figure, the transform of the representation of the user data is passed from an application of application(s) 303 to service provider 351, which returns service data comprising a user-specific output.

Figure 4:
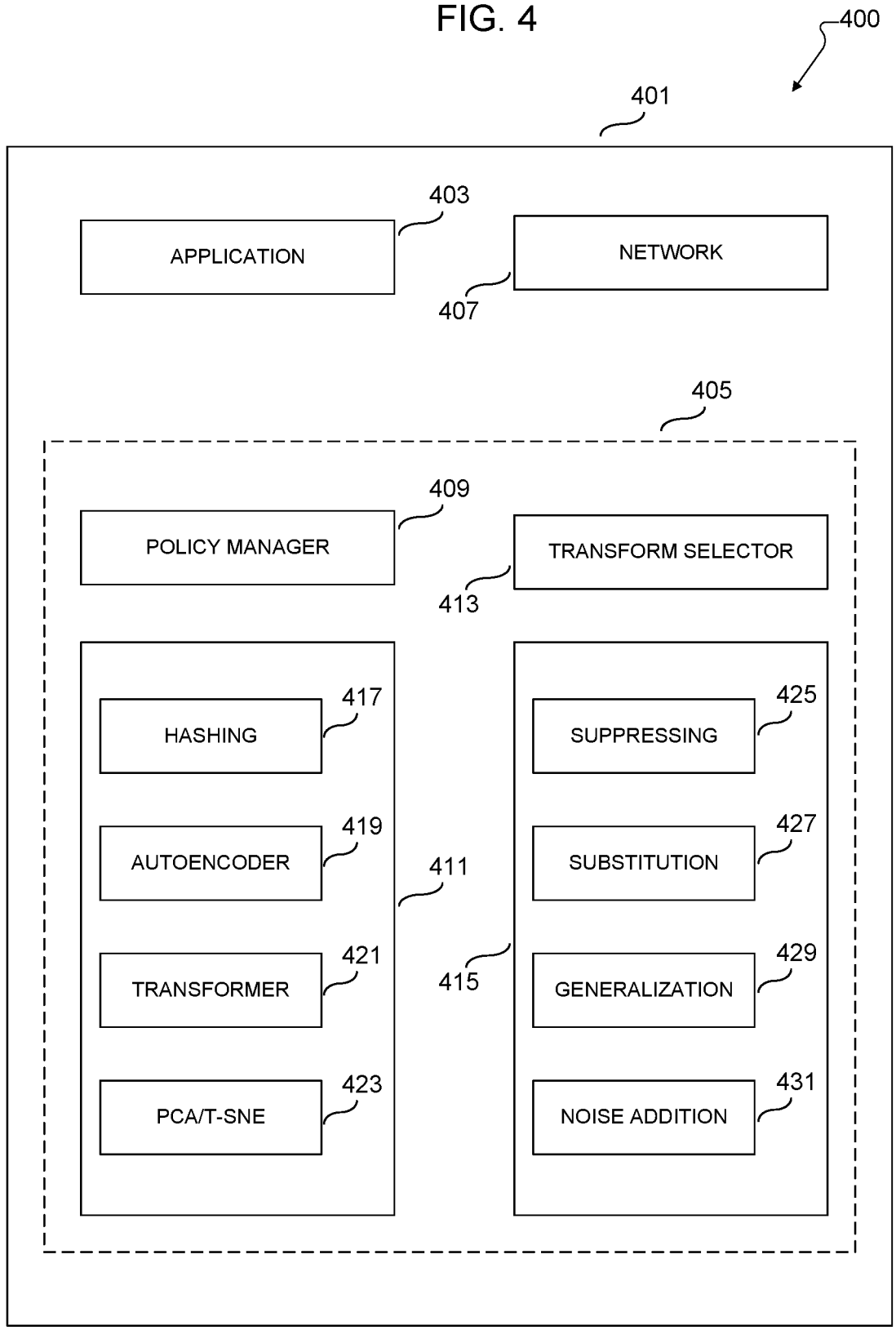
FIG. 4 illustrates an architecture for providing privacy preserving collection of user data according to embodiments of this disclosure.

FIG. 4 illustrates an example of an architecture 400 for implementing privacy-preserving collection of user data according to various embodiments of this disclosure. According to various embodiments, architecture 400 is implemented on a device 401 (for example, device 100) on which one or more applications 403 are executing in a processing environment (sometimes referred to as a "normal world") outside of a trusted execution environment (for example, TEE 163 in FIG. 1). Application(s) 403 comprise applications which collect user data, and consume service data (for example, recommendations or the outputs of computationally intensive tasks, such as voice recognition) from an outside service provider platform (for example, service provider platform 351 in FIG. 3) over one or more network connections.

According to various embodiments, architecture 400 further comprises one or more network interfaces 407 through which device 401 can communicate with external computing platforms which consume perturbed representations of collected user data and return service data. Network interfaces 407 include, without limitation, interfaces for wired network connections (for example, ethernet) as well as baseband processors and radio transceivers for interfacing with wireless network connections (for example, WI-FI, BLUETOOTH, and 5G wireless networks).

Referring to the non-limiting example of FIG. 4, in some embodiments, to enhance security, the steps of generating a representation of user data collected by application(s) 403 and generating a transform of the representation of the user data are performed by processes executing within a trusted execution environment (TEE) 405 provided by device 401. According to certain embodiments, TEE 405 comprises a set of memory and processing resources (for example, a separate processor, or cores of a CPU) that are architecturally and logically, largely isolated from the memory space and processor resources used execute and run applications (for example, application 403) in the "normal world." In this way, TEE 405 provides a secure environment in which highly sensitive data (for example, account numbers for payment applications) can be stored and processed (for example, generating a hash of a stored account number). According to various embodiments, data from the "normal world" can, subject to certain limitations (for example, subject to file size limits) be passed into TEE 405, and TEE 405 can, subject to certain constraints, pass data to the "normal world."

According to various embodiments, a policy manager 409, is resident in TEE 405. In some embodiments, policy manager 409 comprises a file, or application, setting privacy policies for user data obtained from application(s) 403, for example, by specifying which applications' data requires further processing before being shared with a service provider, and the dimensions of the user data which need to be substantially preserved, and the dimensions of the user data which can be more aggressively changed through generation of a representation of the user data and transforming same. According to some embodiments, policy manager 409 may implement predefined rules specifying, for a given species of user data and a given species of service, which representation functionality of a set of representation functionalities 411 is appropriate. For example, certain representation functionalities may be more appropriate where the service provider generates service data based on aggregative methods (for example, checking for the frequency with which a particular word appears in a string of text) than for service providers who provide service data based on artificial intelligence models trained on representations of user data.

Similarly, a transform selector 413 is also resident in TEE 405. According to various embodiments, transform selector 413 selects one or more transforms from a set of transform functionalities 415 for perturbing a representation of user data. Depending on the privacy policy set by policy 409, and again, the inputs and outputs of the processes implemented by the service providers, certain transforms (for example, adding noise) may render the data provided to the service provider unusable for the service provider's purposes. According to various embodiments, transform selector 413 selects a form of local differential privacy (LDP) to be applied to the representation of the user data. Additionally, depending on the data needs of the service provider, it may be possible to concatenate or combine transform modes in order to further obscure identifying user data.

Referring to the non-limiting example of FIG. 4, set of representation functionalities 411 includes, without limitation, a hashing functionality 417, which performs a one-way encoding of the user data, wherein the data is represented as a hash value. According to various embodiments, hashing functionality 417 may further comprise a hash salt, wherein a set of user-specific nonce data (also referred to as a "salt") is added to the user data prior to hashing.

According to some embodiments, set of representation functionalities 411 further includes an autoencoder 419, which according to certain embodiments, is a machine learning (ML) based approach for reducing the dimensionality of the user data by exploiting the structure of the source data. In contrast to hashing, autoencoding is reversible and the user data can be reconstructed from its auto encoded representation.

As shown in the explanatory example of FIG. 4, set of representation functionalities 411 may also include a transformer functionality 421 of the type often used in natural language processing (NLP). According to various embodiments, transformer functionality 421 is another ML-based approach to dimensionality reduction which applies weightings to different parts of the received user data. In this example, the representation of the user data output by transformer functionality 421 is reversible, and the user data can be reconstructed from the output of transformer functionality 421.

In various embodiments, set of representation functionalities 411 further includes principal component analysis/t-distributed stochastic neighborhood embedding (PCA/t-SNE) functionalities 423, which are a further species of reversible transforms, which create a representation of the user data with a reduced dimensionality.

Referring to the non-limiting example of FIG. 4, set of transform functionalities 415 includes, without limitation, a suppressing functionality 425, which can perturb a representation of user data by removing items from the representation. As one example of perturbation by suppression, suppressing functionality 425 may, in some embodiments, remove some or all representations of proper names from a representation of user data.

According to various embodiments, set of transform functionalities 415 further includes, without limitation, a substitution functionality 427, which strategically perturbs the representation by substituting values within the representation (for example, changing instances of "United States" to "Canada") in a way that does not substantially affect the ability of the service provider to provide useful service data.

Referring to the non-limiting example of FIG. 4, set of transform functionalities 415 further includes, without limitation, a generalization functionality 429, which strategically perturbs a representation of user data by substituting a generalized value for a specific value within the representation (for example, changing instances of "Germany" to "Europe") in a way that does not meaningfully affect the ability of the service provider to serviceable service data.

As shown in the illustrative example of FIG. 4, set of transform functionalities 415 further includes a noise addition functionality 431, which perturbs the representation of the user data in a way that the data as represented is slightly inaccurate (for example, a monetary value of $30 might be perturbed to $31), but still perfectly usable for the purposes of generating service data. According to various embodiments, noise additional functionality 431 comprises adding LDP noise, wherein the parameters of the noise addition (i.e., what noise was added and where) are maintained in the TEE, such that the user data can be recovered from the transform at device 401, but not at other devices, as the noise parameters are in the TEE and thus inaccessible to the other devices.

As noted elsewhere herein, depending on the operation of the processes implemented at a service provider platform (for example, service provider platform 351 in FIG. 3), different representations of user data and different transforms may be appropriate. Certain embodiments according to the present disclosure can (for example, through policy manager 409 and transform selector 413 in FIG. 4) select representation and transform functionalities that are appropriate for a user's security requirements as well as the data input requirements of the service provider.

Figure 5:
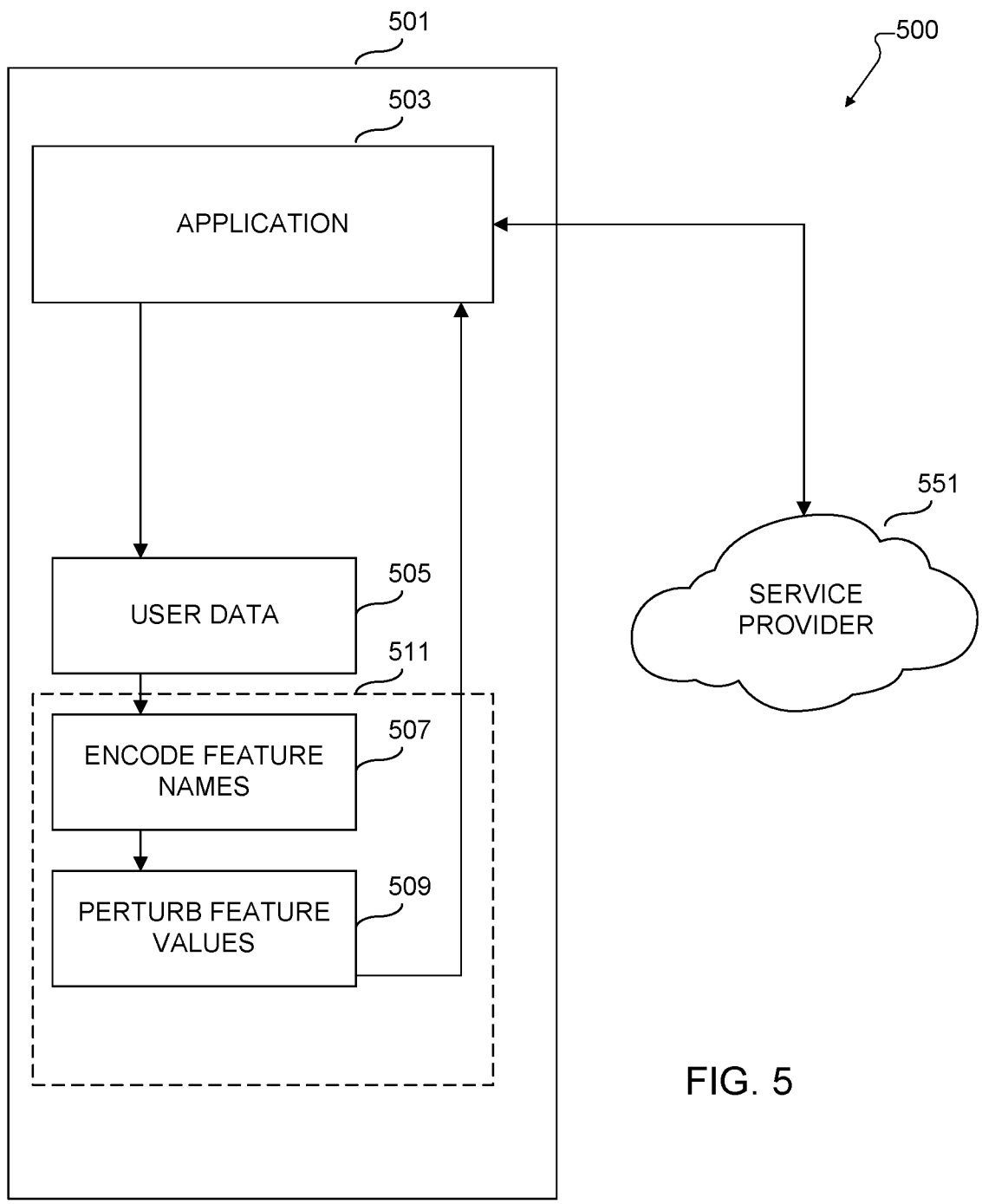
FIG. 5 illustrates an architecture for providing privacy preserving collection of user data according to embodiments of this disclosure.

FIG. 5 illustrates an example of an architecture 500 for privacy preserving collection of user data for a service provider which generates service data based on aggregative analysis of user data. As used in this disclosure, the expression "aggregative analysis" refers to analyses that, as the term rightly suggests, analyze data to identify aggregate-level trends or features across a data set. Examples of aggregative analysis of user data include, without limitation, statistical analysis of a user's typed inputs to determine the frequency with which particular words are used. In this way, aggregative analyses can be used, for example, to generate service data for, training and refining an autocomplete function of a text or email program. Continuing with this non-limiting example, aggregative analysis of user data may show that for "User A," the text string "Dav-" typically completes as "Dave," but for "User B," the text string "Dav-" typically completes as "Davenport."

For the instant case, where the service provider provides service data based on aggregative analysis of user data, or a privacy enhanced proxy for user data, the technical challenges associated with processing the user data to preserve the user's privacy include, without limitation, obfuscating the data in a way that retains the statistical features of the user data set (so that an analysis of the frequency with which, for example, a specific user completes a given text string with "word A" versus "word B") are substantially preserved, while at the same time, identifying specifics (for example, the actual names of the individuals with whom the user corresponds) are not recoverable from what the electronic device sends to the service provider platform.

Referring to the non-limiting example of FIG. 5, architecture 500 comprises an electronic device 501 (an instance of, for example, device 100 in FIG. 1, device 301 in FIG. 3, or device 401), which is communicatively connected via a network to a service provider platform 551 (an instance of, for example, server 200 in FIG. 2, or service provider platform 351 in FIG. 3).

As shown in the figure, certain embodiments of architecture 500 are similar to architecture 300 in FIG. 3 in that they comprise one or more applications 503 (for example, instances of applications 303 in FIG. 3) which collect user data 505 for services provided through the applications themselves, or on behalf of other applications (i.e., application "A" collecting user data to provide a service through application "B").

As shown in the illustrative example of FIG. 5, device 501 implements a trusted execution environment (TEE) 511 (for example, an instance of TEE 163) where data and processing of data can be made inaccessible to processes executing outside of TEE 511, including processes executing in a "normal world" environment of device 501, or processes executing on computing platforms other than device 501. The enforced separation between processes executing in TEE 511 and outside TEE 511 means that, from the perspective of applications outside of TEE 511, TEE 511 comprises a "black box" in which data and processing can occur under conditions that cannot be fully known to outside processes. As discussed herein, certain embodiments according to this disclosure leverage the isolation and opacity of TEE 511 to outside processes in a way that allows user data to be modified such that processes outside TEE 511 do not have the information (for example, a hashing salt stored in TEE 511) to reverse or otherwise recover user data from processes performed at least in part within TEE 511.

According to various embodiments, at block 507, user data 505 is passed to TEE 511, wherein the feature names within the user data are encoded. In certain embodiments, the feature names are encoded as key-value pairs of an n-gram frequency vector, wherein n refers to the number of items within a key of a key-value pair. FIG. 6 of this disclosure provides an example of a 2-gram frequency vector as applied to user data comprising typed text. As shown in FIG. 6, by converting strings of text into key-value pairs with an input (for example, a word or feature of a user's interaction, such as touches of a screen) as the key, and frequency values, a potential large corpus of user data can be compactly represented in a way that the data of principal interest for an aggregative analysis by a service provider. That is, in this illustrative example, the feature vector is a representation of the user data. Re-representing the user data as a frequency vector provides at least the following benefits—it reduces the dimensionality of the data and the amount of data which needs to be sent over a network to service provider platform 551, and also obfuscates the source data in a way that makes it difficult to discern the underlying user data in the vector representation. However, because determined malicious actors may be able to recover aspects of the user data using frequency analysis or similar methods, certain embodiments according to the present disclosure may further encode the frequency vector by performing one or more of reordering the elements of the frequency vector and calculating hashes of the keys of the frequency vectors using a hashing process within TEE 511. In this way, the keys of the frequency vectors become generally unintelligible to processes outside of TEE 511, as the associations between the original keys and their hashes are maintained within the highly secure enclave of TEE 511.

According to certain embodiments, the representation of the user data generated at block 507 is further transformed at block 509, through the application of one or more transforms of a set of transforms (for example, set of transform functionalities 415 in FIG. 4) which can be executed within TEE 511. In this example, TEE 511 generates a transform which applies local differential privacy (LDP) in the form of statistical noise (i.e., values of key value pairs of the frequency vectors are altered through the application of a noise algorithm) such that the actual frequency values, while close enough to the actual values in the user data for the purposes of aggregative analysis to be performed at service provider platform 551, differ sufficiently to frustrate efforts at recovering the text of the user data via frequency analysis or other statistical tools.

As shown in the illustrative example of FIG. 5, the transform of the representation of the user data is provided over a network to service provider platform 551, which performs aggregative analysis of the representation of the user data and returns service data to device 501 for consumption by one or more of applications 503 executing on device 501.

FIG. 6 illustrates an example of generating a representation of user data and then generating a transform of the representation of the user data according to various embodiments of this disclosure. In the explanatory example of FIG. 6, the raw user data comprises text data entered by a user (for example, a user's SMS text messages over a given sample interval), which, depending on how prolific a texter the user is, and the extent to which the user augments their text messages with other media content (for example, image or sound files), may comprise a significant amount of data, and more importantly, a significant amount of data that is unnecessary for an analysis of user data performed at a service provider platform (for example, server 200 in FIG. 2 or service provider platform 351 in FIG. 3). In the non-limiting example of FIG. 6, the user data is being collected for aggregative analysis at one or more service provider platforms.

To reduce the dimensionality of the raw data and obfuscate identifying content (for example, pictures or full sentences), while, at the same time, preserving the data's usefulness for analysis and generation of service data, certain embodiments according to this disclosure obtain a representation of the collected user data. In the illustrative example of FIG. 6, a first representation 601 of the user data as a 2-gram frequency vector is obtained. In this way, the user's collected text messages are represented as a vector of key-value pairs, in which the keys comprise words of analytical interest, and n-grams (i.e., sets of 1 to n items) of words of analytical interest, and the values comprise the frequency with which the words or n-grams (in this case, n=2, and the n-grams are pairs of words) appear within the raw user data. For example, first key 603 is associated with first value 605, indicating that the word "my" appears 30 times within the collected user data. Similarly, second key 607 is associated with second value 609, indicating that the word pair (or, 2-gram) "is Jack" appears twenty times within the collected data. In some embodiments, first representation 601 is generated by a process inside a TEE. In certain embodiments, first representation 601 is generated by a process outside of the TEE.

While first representation 601 significantly obfuscates much of the content of the user data while preserving the frequency values of lexical features of interest, user-specific content may still be recoverable using brute force techniques to try and reconstruct combinations of text in which the keys of the key-values remain actual words. To further enhance the privacy of user data in a representation of user data, first representation 601 may be further encoded to obtain a second representation 611 of the user data. In this illustrative example, the feature vector of first representation 601 is salted, scrambled and hashed to further obfuscate the represented user data.

Referring to the non-limiting example of FIG. 6, first representation 601 is salted, through the addition of dummy values (for example, first dummy value 613) at predetermined points in the vector. Further, first representation 601 is scrambled, in that the key-value pairs of first representation 601 are transposed to new locations within second representation 611. For example, the key "is jack" and its associated value 20 have, in second representation 611, been moved from a terminal position within the feature vector to the fourth-from-the-last position. Still further, the keys of the key-value pairs are hashed by one or more hashing applications resident in the TEE of the electronic device, such that the TEE maintains the association between the unhashed key values (i.e., words and n-grams of words) and their hashes in a memory inaccessible to processes outside of the TEE. According to certain embodiments, the hashes of the key-value pairs (for example hashed key 615) are represented as unique alphanumeric strings. According to various embodiments, the combination of salting, scrambling and hashing used to generate second representation 611 render the keys of the key-value pairs of the frequency vector generally unintelligible to processes outside the TEE.

Depending on, without limitation, the volume and nature of the user data and the persistence and sophistication of the malicious actors, facets of a specific user's data may be still be recoverable from a representation (for example, second representation 611) of the user data. To limit the potential for recoverability of a user's specific data, certain embodiments according to this disclosure apply local differential privacy (LDP) to the representation of the data to generate a transform of the representation of the user data. According to some embodiments, the parameters of how the service provider platform generates service data from user data are determinative of the parameters (for example, the form of LDP used, and how aggressively values are changed) of the transform.

Referring to the illustrative example of FIG. 6, a transform 621 of second representation 611 of the user data is shown in the figure. As shown in this illustrative example, the frequency values of the key-value pairs of the frequency vector have been perturbed slightly from the actual values found in the user data. For example, value 623 has been perturbed to 16, even though 20 instances of the word "Jack" exist in the user data. According to some embodiments, such application of local differential privacy (i.e., introducing differences in the source data for another process, such as the generation of service data) can make it effectively impossible to recover anything identifying regarding the user from transform 621. However, because, in this explanatory example, the service provider platform performs an aggregative analysis likely based on numerous transforms of a user's data, provided there are no aggregate biases (i.e., addition of noise increases frequency values more often than it reduces frequency values), the LDP noise effectively cancels itself out for the purposes of the aggregative analyses undertaken at a service provider platform.

Figure 7:
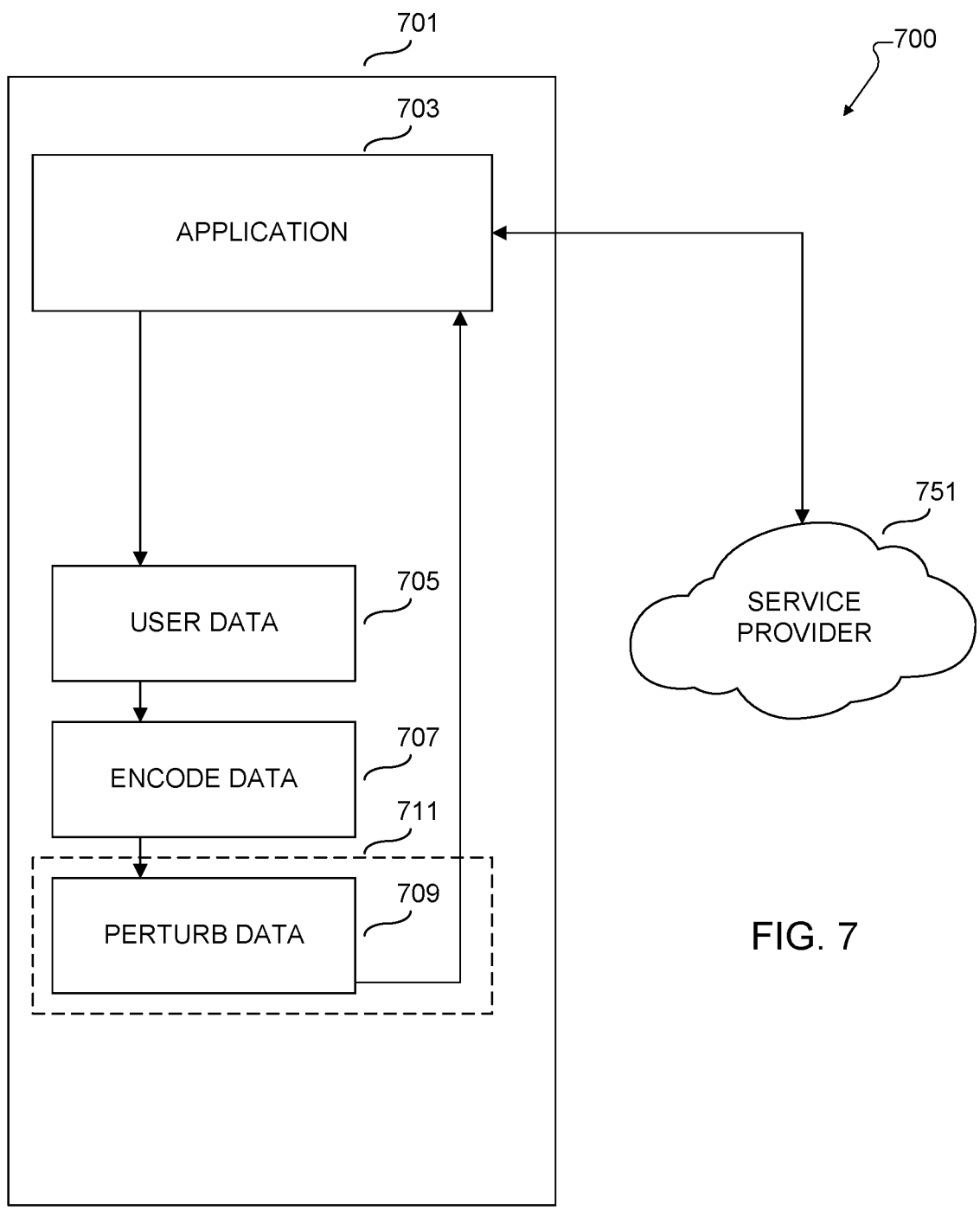
FIG. 7 illustrates an architecture for providing privacy preserving collection of user data according to embodiments of this disclosure.

FIG. 7 illustrates an example of an architecture 700 for privacy preserving collection of user data for a service provider which generates service data based on the application of artificial intelligence (AI) or machine learning models (ML) to user data. As noted elsewhere in this disclosure, in certain embodiments according to the present disclosure, the control logic (for example, policy manager 409 and transform selector 413 in FIG. 4) generate a representation of collected user data and transforms of same, based, at least in part, on information about the processes implemented by a service provider platform to obtain service data. While some service provider platforms generate service data based on aggregative analyses across a full set of user data, other service provider platforms generate service data based on AI/ML analyses, which perform targeted analyses to obtain a result from only a subset of the available data. As one illustrative example, certain object recognition algorithms exclude regions of image data which is recognized as the background. Thus, the technical challenges of collecting user data for AI/ML analyses in a way that preserves the privacy of users' data include, without limitation, preserving features within portions of the user data that are analytically relevant for AI/ML processes used to generate service data, while at the same time, obfuscating, or excluding data that is irrelevant to the generation of service data, but from which identifying information of a specific user can be recovered.

Referring to the illustrative example of FIG. 7, architecture 700 comprises an electronic device 701 (for example, an instance of device 100 in FIG. 1, device 301 in FIG. 3, or device 401 in FIG. 4) which is communicatively connected to a service provider platform 751 (for example, an instance of server 200 in FIG. 2, or service provider platform 351 in FIG. 3). Architecture 700 further comprises application(s) 703, which comprise one or more applications (for example, instances of applications 303 in FIG. 3) executing on electronic device 701 outside of trusted execution environment 711 (for example, an instance of TEE 163 in FIG. 1 or TEE 311 in FIG. 3). According to various embodiments, application(s) 703 comprise one or more applications which collect user data 705 which can be used by service provider platform 751 to generate service data, and which also consume service data provided by service provider platform 751.

According to various embodiments, at block 707, user data 705 is encoded to generate a representation of the data, wherein the representation of the data is of reduced dimensionality (i.e., does not contain all of the information of the underlying user data, but, at the same time, does not comprise as much data volume). Encoding the data at block 707 can provide the technical benefits of reducing the user data's intelligibility to outside processes (other than processes at the service provider, which may be preconfigured to feed encoded user data to one or more AI/ML models), and of reducing the amount of data which device 701 sends across a network to service provider platform 751, thereby conserving processor and battery resources of device 701. According to some embodiments, device 701 may be provided with a common set of encoders (for example, encoders belonging to set of representation functionalities 411 in FIG. 4), and a set of APIs by which applications can receive suitably formatted service data from service provider platform 751.

In some embodiments, at block 707, user data 705 is encoded into a small vector representation of the user data by an encoder of a set of representation functionalities of device 701. Suitable encoders for encoding user data as a small vector include, without limitation, autoencoders, transformers (for example, bidirectional encoder representations from transformers ("BERT") encoders), PCA encoders, and T-SNE encoders. According to certain embodiments, the encoders are further configured to only keep and encode data relevant for the specific computing tasks to be performed at the service provider platform.

Referring to the non-limiting example of FIG. 7, at block 709, the encoded representation of the user data is sent to TEE 711, where the representation of the data is perturbed (for example, through the addition of LDP noise) to obtain a transform of the representation of the data. According to some embodiments, the application of noise through LDP may be described as follows:

a.) Let x be a data item within a domain D. According to various embodiments, domain D may be a range of values in small vector representation of some portion of collected user data 705. According to various embodiments, there are no specific restrictions on the type of data which x can be. Examples of suitable data types include, without limitation, binary data, categorical data, ordinal, discrete data and continuous data.

b.) According to certain embodiments, domain D is divided into k subdomains, or depending on the data type, intervals or buckets, for which a center $a_i$ is chosen for each subdomain $D_i$ is chosen. For a given LDP mechanism, A, A changes x into $a_i$ according to Equation 1, below:

$$Pr[A(x) = a_i] = \begin{cases} 1 - p, & \text{if } i = \underset{i \leq k}{\text{argmin}} Dist(x, a_i) \\ \frac{p}{k-1}, & \text{otherwise} \end{cases} \quad (1)$$

Where p is a parameter tuning the "noisiness" of the LDP applied, wherein the greater the value of p, the greater the difference between the value of A(x) and x.

Referring to the illustrative example of FIG. 7, once a transform of the representation of the user data is obtained at block 709, the transform is provided to the service provider platform 751, which, in response, returns service data to be consumed by one or more of applications 703.

While the present disclosure has been described with reference to embodiments in which a representation of the user data is generated by encoding user data prior to generating a transform of the data in a TEE, the present disclosure is not so limited. Generating a representation of the user data may improve efficiency by reducing the dimensionality (and by implication, the volume) of the data provided by the device to the service provider platform and make it harder for user data to be recovered from its representation, but it is not strictly necessary. In certain embodiments, the processes performed at the service provider platform (for example, speech recognition, or a virtual digital assistant for an automobile) may require that what is provided to the service provider platform be potentially intelligible by a human being. For example, if the service provider platform may expect to receive voice data from a user in an emergency, human intelligibility may be necessary as a failsafe in the event that an AI/ML speech recognition system cannot accurately process a request. In such embodiments, generating a representation of the user data may be omitted, and instead, a transform perturbing the user data (as opposed to a representation thereof) to protect a user's privacy may be performed in the TEE, prior to sending the user data to the service provider platform.

FIG. 8 illustrates operations of an example method 800 for performing privacy-preserving collection of user data according to various embodiments of this disclosure. The operations described with reference to FIG. 8 may be performed on any suitable apparatus on which user data is generated and collected (for example, instances of device 100 in FIG. 1, device 301 in FIG. 3, device 401 in FIG. 4, device 501 in FIG. 5 or device 701 in FIG. 7), and which passes the collected user data to one or more service provider platforms, which utilize the user data to generate service data, which is consumed by one or more applications of the device to make one or more functionalities of an application executing on the device more specific to a particular user, or group of users to which the user providing the user data belongs. Examples of making functionalities of an application more user-specific include, without limitation, autocomplete functions tuned based on the user's writing habits, speech recognition functionalities which have been refined based on data indicating the user's speech habits, or location suggestions for a navigation application based on a user's travel history.

Referring to the non-limiting example of FIG. 8, at operation 805, a processor of the device (for example, main processor 140 in FIG. 1) obtains user data based on a user's interactions with one or more applications (for example, applications 162 in FIG. 1) executing on the device, wherein at least one of the applications on the device consumes service data provided to the device over a network from a service provider platform (for example, service provider platform 351 in FIG. 3).

As shown in the illustrative example of FIG. 8, at operation 810, the processor generates a representation of the user data obtained at operation 805. According to some embodiments, generating the representation of the data comprises expressing the data in a small vector format, which reduces the dimensionality of the data, and provides a first layer of obfuscation of any identifying data within the represented data. In certain embodiments, generating the representation of the data comprises calculating hashes of elements (for example, the keys of a set of key-value pairs) of the represented data. Further in some embodiments, the representation of the user data may contain further obfuscation or encoding of the data, such as salting the data, or rearranging elements within the representation according to a mapping maintained in a TEE of the device. Depending on embodiments, a mechanism for generating the user data is determined based on information maintained at the device regarding the operation of the service provider platform. For example, and as discussed with reference to the illustrative examples of FIGS. 5 and 7 of this disclosure, where the device knows that the service provider platform is performing an aggregative analysis, the device utilizes a first mechanism for generating a representation of the user data, but when the device knows that the service provider platform is performing an AI/ML based analysis to generate the service data, a different representation functionality may be utilized. Similarly, where the device knows, for example, that the service provider platform requires that user data be intelligible to humans (for example, a speech recognition application where user data may comprise emergency commands (i.e., statements such as, "Call an ambulance."), operation 810 may be omitted. In some embodiments, operation 810 is performed within a trusted execution environment (for example, an instance of TEE 163 in FIG. 1) of the device. In some embodiments, operation 810 is performed outside of the TEE, in a "normal world" execution environment.

As shown in the illustrative example of FIG. 8, at operation 815, local differential privacy (LDP) is applied, by a process executing in the TEE of the device, to generate a transform of the representation of the user data. In certain embodiments, generating the transform of the representation of the user data comprises adding LDP noise to the values of the representation (for example, as illustrated by transform 621 in FIG. 6). Depending on embodiments, the mechanism for generating the transform at operation 815 is selected at least in part based on the operation of the service provider platform. Further, in some embodiments, the extent of the transform (for example, the values of p or k in Equation 1) are determined based on the operation and requirements of the service provider platform.

According to various embodiments, at operation 820, the transform of the representation of the user data is sent, via a network, to a service provider platform (for example, server 200 in FIG. 2 or service provider platform 351 in FIG. 3). In some embodiments, the transform is sent via one or more application programming interfaces resident on the electronic device and configured for interfacing with one or more service provider platforms. As shown in the non-limiting example of FIG. 8, at operation 825, the electronic device receives the service data from the service provider platform, which is consumed by one or more applications of the device to provide a user-specific functionality. According to certain embodiments, the user-specific functionality comprises control of one or more accessory devices communicatively coupled to the electronic device. For example, where a user's user data indicates that the user is typically asleep by 10:30 p.m., the device may receive service data instructing an internet of things application (IoT) executing on the device to turn off one or more linked devices (for example, a smart lightbulb or radio) at 10:40. In this way, certain embodiments as disclosed and claimed enhance the privacy and security with which user data is collected and provided to service provider platforms, thereby catalyzing an expanded use of service data by applications executing on the device.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method, comprising:
   obtaining, by a first application executing on a processor of an electronic device, user data of a user who uses the first application;
   generating, at the electronic device, a representation of the user data;
   applying local differential privacy to the representation of the user data in order to generate a transform of the representation of the user data and obscure the user data;
   sending the transform of the representation of the user data from the electronic device to a service provider via a network;

receiving, from the service provider via the network at the electronic device, service data based on the transform of the representation of the user data; and personalizing execution of the first application or a second application executing on the processor of the electronic device based on the service data;

wherein the service data comprises a user-specific output based on the transform of the representation of the user data, wherein the first application executes outside of a trusted execution environment (TEE) of the electronic device, and wherein the transform of the representation of the user data is generated in the TEE of the electronic device.

2. The method of claim 1, wherein generating the representation of the user data comprises converting the user data into a feature vector.

3. The method of claim 2, wherein applying local differential privacy to generate the transform of the representation of the user data comprises calculating a hash of the feature vector.

4. The method of claim 3, wherein applying local differential privacy further comprises adding noise to the feature vector.

5. The method of claim 1, wherein generating the representation of the user data comprises locally encoding the user data as a vector, wherein the vector comprises information consumed by a predefined process of the service provider.

6. The method of claim 5, wherein applying local differential privacy comprises adding noise to the locally encoded user data.

7. The method of claim 5, wherein the predefined process of the service provider comprises an artificial intelligence (AI) model trained by the service provider.

8. An apparatus, comprising:
a processor;
a network interface;
a sensor configured to receive user data of a user who uses a first application executing on the processor of the apparatus; and
a memory containing instructions that, when executed by the processor, cause the apparatus to:
obtain, by the first application from the sensor, the user data,
generate a representation of the user data,
apply local differential privacy to the representation of the user data in order to generate a transform of the representation of the user data and obscure the user data,
send the transform of the representation of the user data from the apparatus to a service provider via the network interface,
receive, from the service provider via the network interface at the apparatus, service data based on the transform of the representation of the user data, and
personalize execution of the first application or a second application executing on the processor of the apparatus based on the service data,
wherein the service data comprises a user-specific output based on the transform of the representation of the user data,
wherein the apparatus is configured to execute the application outside of a trusted execution environment (TEE) of the apparatus, and wherein the apparatus is configured to generate the transform of the representation of the user data in the TEE of the apparatus.

9. The apparatus of claim 8, wherein the instructions that when executed cause the apparatus to generate the representation of the user data comprise instructions that when executed cause the apparatus to convert the user data into a feature vector.

10. The apparatus of claim 9, wherein the instructions that when executed cause the apparatus to apply local differential privacy to generate the transform of the representation of the user data comprise instructions that when executed cause the apparatus to calculate a hash of the feature vector.

11. The apparatus of claim 10, wherein the instructions that when executed cause the apparatus to apply local differential privacy further comprise instructions that when executed cause the apparatus to add noise to the feature vector.

12. The apparatus of claim 8, wherein the instructions that when executed cause the apparatus to generate the representation of the user data comprise instructions that when executed cause the apparatus to locally encode the user data as a vector, wherein the vector comprises information consumed by a predefined process of the service provider.

13. The apparatus of claim 12, wherein the instructions that when executed cause the apparatus to apply local differential privacy comprise instructions that when executed cause the apparatus to add noise to the locally encoded user data.

14. The apparatus of claim 12, wherein the predefined process of the service provider comprises an artificial intelligence (AI) model trained by the service provider.

15. A non-transitory computer-readable medium containing instructions that, when executed by a processor, cause an apparatus to:
obtain, by a first application executing on the processor of the apparatus from a sensor, user data of a user who uses the first application,
generate a representation of the user data,
apply local differential privacy to the representation of the user data in order to generate a transform of the representation of the user data and obscure the user data,
send the transform of the representation of the user data from the apparatus to a service provider via a network interface,
receive, from the service provider via the network interface at the apparatus, service data based on the transform of the representation of the user data, and
personalize execution of the first application or a second application executing on the processor of the apparatus based on the service data,
wherein the service data comprises a user-specific output based on the transform of the representation of the user data,
wherein the instructions when executed cause the apparatus to execute the application outside of a trusted execution environment (TEE) of the apparatus, and
wherein the instructions when executed cause the apparatus to generate the transform of the representation of the user data in the TEE of the apparatus.

16. The non-transitory computer-readable medium of claim 15, wherein the instructions that when executed cause the apparatus to generate the representation of the user data comprise instructions that when executed cause the apparatus to convert the user data into a feature vector.

17. The non-transitory computer-readable medium of claim 16, wherein the instructions that when executed cause the apparatus to apply local differential privacy to generate the transform of the representation of the user data comprise instructions that when executed cause the apparatus to calculate a hash of the feature vector.

18. The non-transitory computer-readable medium of claim 17, wherein the instructions that when executed cause the apparatus to apply local differential privacy further comprise instructions that when executed cause the apparatus to add noise to the feature vector.

19. The non-transitory computer-readable medium of claim 15, wherein the instructions that when executed cause the apparatus to generate the representation of the user data comprise instructions that when executed cause the apparatus to locally encode the user data as a vector, wherein the vector comprises information consumed by a predefined process of the service provider.

20. The non-transitory computer-readable medium of claim 19, wherein the instructions that when executed cause the apparatus to apply local differential privacy comprise instructions that when executed cause the apparatus to add noise to the locally encoded user data.

\* \* \* \* \*